(12) United States Patent
Lin et al.

(10) Patent No.: US 10,222,502 B2
(45) Date of Patent: Mar. 5, 2019

(54) CONTENT DETECTION DEVICES

(71) Applicant: Quanta Computer Inc., Taoyuan (TW)

(72) Inventors: Mao-Sung Lin, Taoyuan (TW);
Jia-Chen Liaw, Taoyuan (TW); Chi-Li Li, Taoyuan (TW); Chun-Hao Lien, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 37 days.

(21) Appl. No.: 15/584,124

(22) Filed: May 2, 2017

(65) Prior Publication Data
US 2018/0172864 A1    Jun. 21, 2018

(30) Foreign Application Priority Data
Dec. 20, 2016   (TW) .............................. 105142201 A

(51) Int. Cl.
| | |
|---|---|
| *G01B 7/14* | (2006.01) |
| *G01V 3/08* | (2006.01) |
| *A45C 1/02* | (2006.01) |
| *A45C 3/00* | (2006.01) |
| *A45C 15/00* | (2006.01) |

(52) U.S. Cl.
CPC .................. *G01V 3/08* (2013.01); *A45C 1/02* (2013.01); *A45C 3/00* (2013.01); *A45C 15/00* (2013.01)

(58) Field of Classification Search
CPC ... G01V 3/08; G01V 3/10; G01V 3/12; G01B 21/18; G08B 13/24; G08B 13/181; G08B 13/126
See application file for complete search history.

(56) References Cited

U.S. PATENT DOCUMENTS 5,684,458 A * 11/1997 Calvarese ............... G01S 13/56
340/552
8,054,203 B2 * 11/2011 Breed ..................... B60C 11/24
340/931

FOREIGN PATENT DOCUMENTS

TW          M527988 U         9/2016

OTHER PUBLICATIONS

TW Office Action dated May 18, 2017 in corresponding Taiwan application (No. 105142201).

* cited by examiner

*Primary Examiner* — Minh N Tang

(74) *Attorney, Agent, or Firm* — McClure, Qualey & Rodack, LLP

(57) ABSTRACT

A content detection device is provided. The content detection device includes a first sensor and a controller. The first sensor is disposed near a space. The controller is coupled to the first sensor and detects a state of the first sensor. The controller performs a determination operation to determine whether an object is disposed in the space according to the detected state of the first sensor.

9 Claims, 14 Drawing Sheets

US 10,222,502 B2

CONTENT DETECTION DEVICES

CROSS REFERENCE TO RELATED APPLICATIONS

This Application claims priority of Taiwan Patent Application No. 105142201, filed on 2016 Dec. 20, the entirety of which is incorporated by reference herein.

BACKGROUND OF THE INVENTION

Field of the Invention

The invention relates to a detection device, and more particularly to a content detection device for detecting whether an object is in a specific space.

Description of the Related Art

In recent years, smartphones have become popular electronic devices. In order to meet users' various requirements, application programs for smartphones are continuously being developed. In addition to communication, images, and games, various application programs which can interact with external devices are also being developed, for example, application programs for monitoring bio-signals and application programs for controlling household apparatuses. Thus, development of electronic devices which can communicate with or connect to smartphones is an important issue.

BRIEF SUMMARY OF THE INVENTION

The invention provides a content detection device for detecting whether an object is in a specific space. The content detection device can communicate with a portable electronic device and transmits the detection result to the portable electronic device.

An exemplary embodiment of a content detection device is provided. The content detection device comprises a first sensor and a controller. The first sensor is disposed near a space. The controller is coupled to the first sensor and detects a state of the first sensor. The controller performs a determination operation to determine whether an object is disposed in the space according to the detected state of the first sensor.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
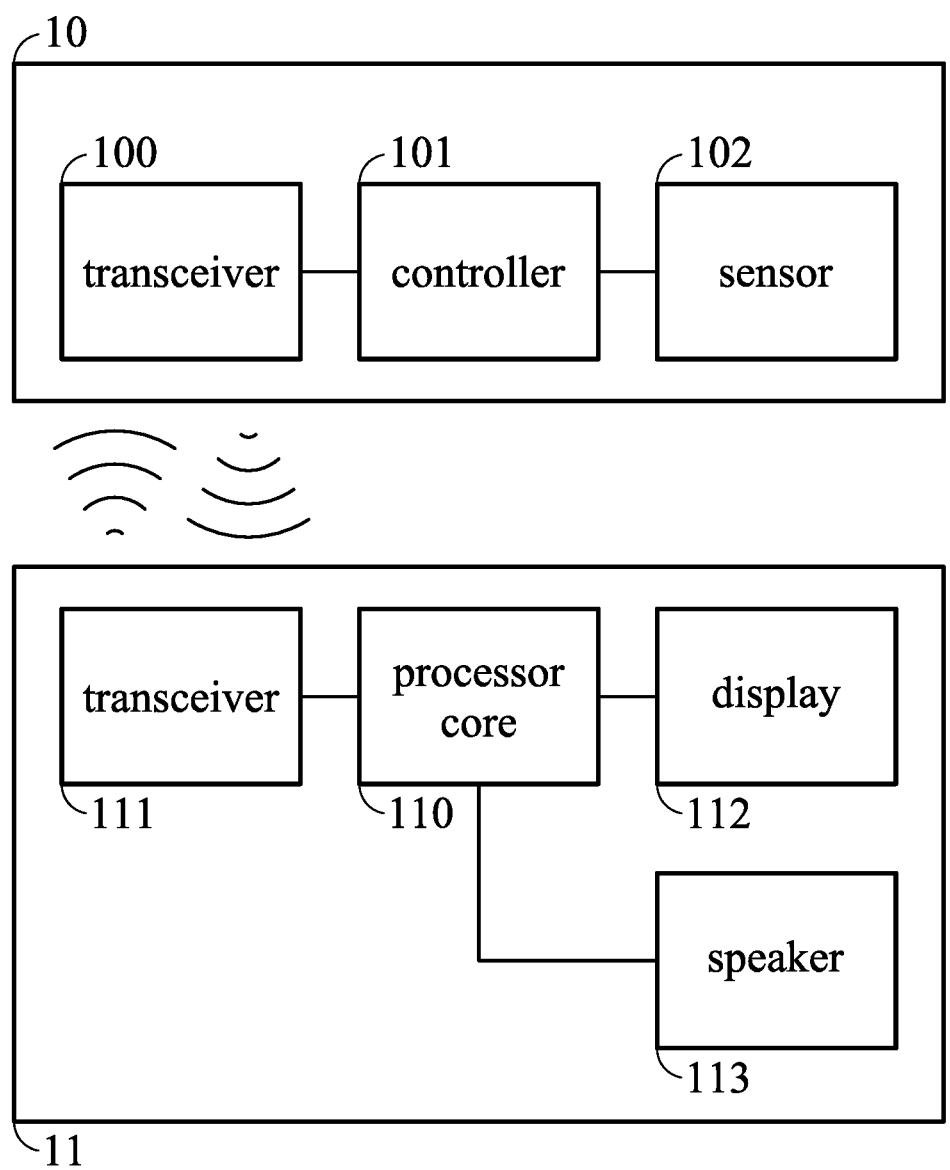
FIG. 1 shows an exemplary embodiment of an electronic system.
Figure 2A:
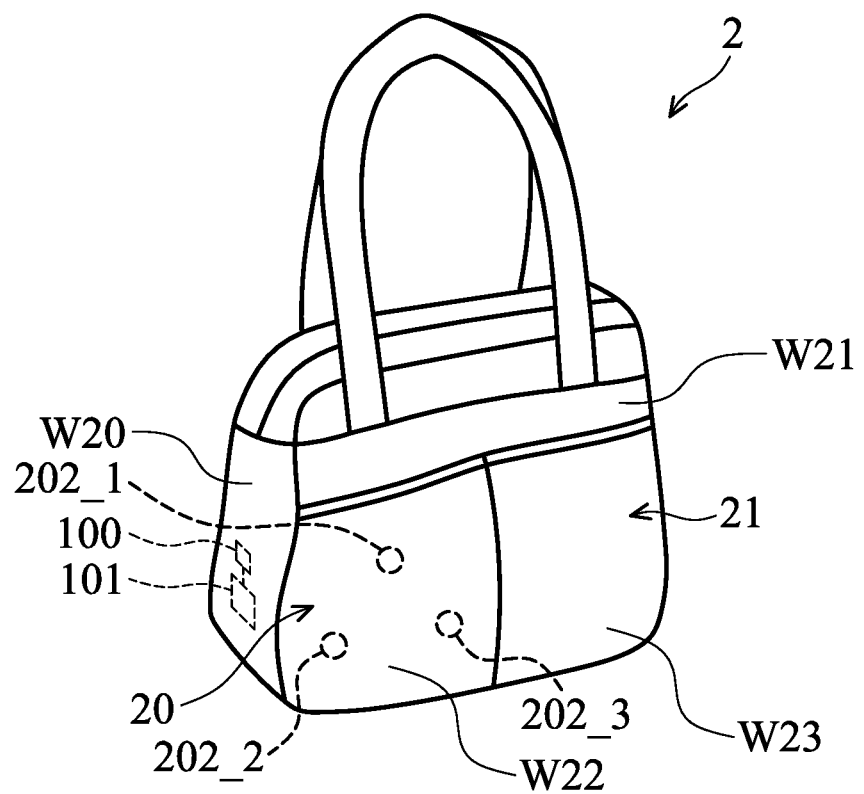
FIG. 2A is a schematic view showing sensors disposed on a pocket according to one exemplary embodiment.

FIG. 1 shows an exemplary embodiment of an electronic system. Referring to FIG. 1, an electronic system 1 comprises a content detection device 10 and a receiving device 11. In an embodiment, the receiving device 11 comprises a processor core 110 which can perform application programs. The receiving device 11 further comprises a transceiver 111 which can receive and transmit signals through a wired or wireless connection. Moreover, the receiving device 11 also comprises a display 112 or a speaker 113. When the processor core 110 of the receiving device 11 runs an application program, the display 112 can show corresponding images or the speaker 113 can play specific audio. In an embodiment, the receiving device 11 is a portable device, such as a smartphone, a tablet, and so on. Referring to FIG. 1, the content detection device 10 comprises a transceiver 100, a controller 101, and at least one sensor 102. The content detection device 10 is disposed on an object with at least one pocket, such as an article of clothing, a carry bag, or a backpack. In the following paragraphs, a carry bag is given as an example for illustration. Referring to FIG. 2A, a carry bag 2 comprises at least one pocket. For example, the carry bag 2 may comprise two pockets 20 and 21. The transceiver 100 and the controller 101 are disposed in any position in the carry bag 2. In an embodiment, the transceiver 100 and the controller 101 are disposed on the internal side of the wall W20. In FIG. 2A, since the transceiver 100 and the controller 101 cannot be observed from the exterior of the carry bag 2, the transceiver 100 and the controller 101 are represented by dotted lines. The walls W21 and W20 of the carry bag 2 which are opposite to each other form the pocket 20, and there is an internal space surrounded by the walls W21 and W22. The walls W21 and W23 of the carry bag 2 which are opposite to each other form the pocket 21, and an internal space is formed by being ringed with the walls W21 and W23.

Figure 2B:
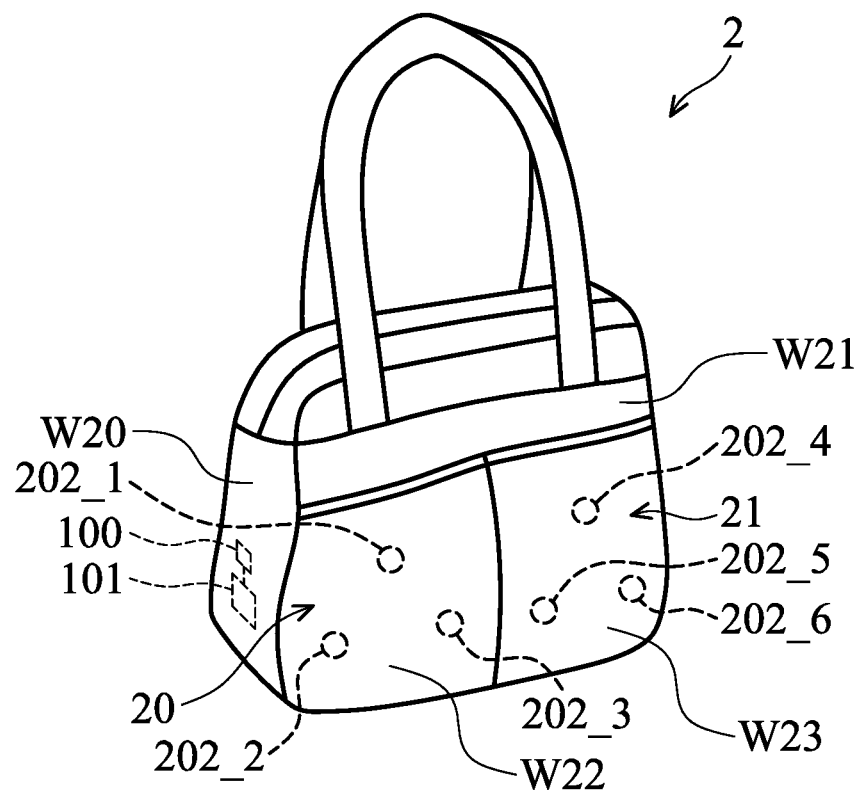
FIG. 2B is a schematic view showing sensors disposed on pockets according to one exemplary embodiment.

In an embodiment, the content detection device 10 comprises only one sensor which is disposed in the pockets 20 or 21. In another embodiment, the content detection device 10 comprises a plurality of sensors (more than two sensors) which are dispersed and disposed in the pockets 20 and 21 or all are disposed in the same pocket (such as the pocket 20). The number (N) of pockets where at least one sensor is disposed and the number (M) of sensors disposed in the same pocket are determined according to system requirements. For example, in the embodiment of FIG. 2A, the content detection device 10 comprises three sensors 202_1~202_3, and the sensors 202_1~202_3 are disposed in the same pocket 20. In another embodiment, as shown in FIG. 2B, the content detection device 10 comprises six sensors 202_1~202_6. Three sensors 202_1~202_3 are all disposed in pocket 20, while the other three sensors 202_4~202_6 are all disposed in pocket 21.

In the embodiment of FIG. 2B, a plurality of sensors are disposed in a plurality of pockets. The controller 101 can successively assign reference pocket numbers to the pockets in which the sensors are disposed. For example, the pocket 20 containing sensors 202_1~202_3 is numbered as reference pocket number #1, and pocket 21 containing sensors 202_4~202_5 is numbered as reference pocket number #2.

Figure 3:
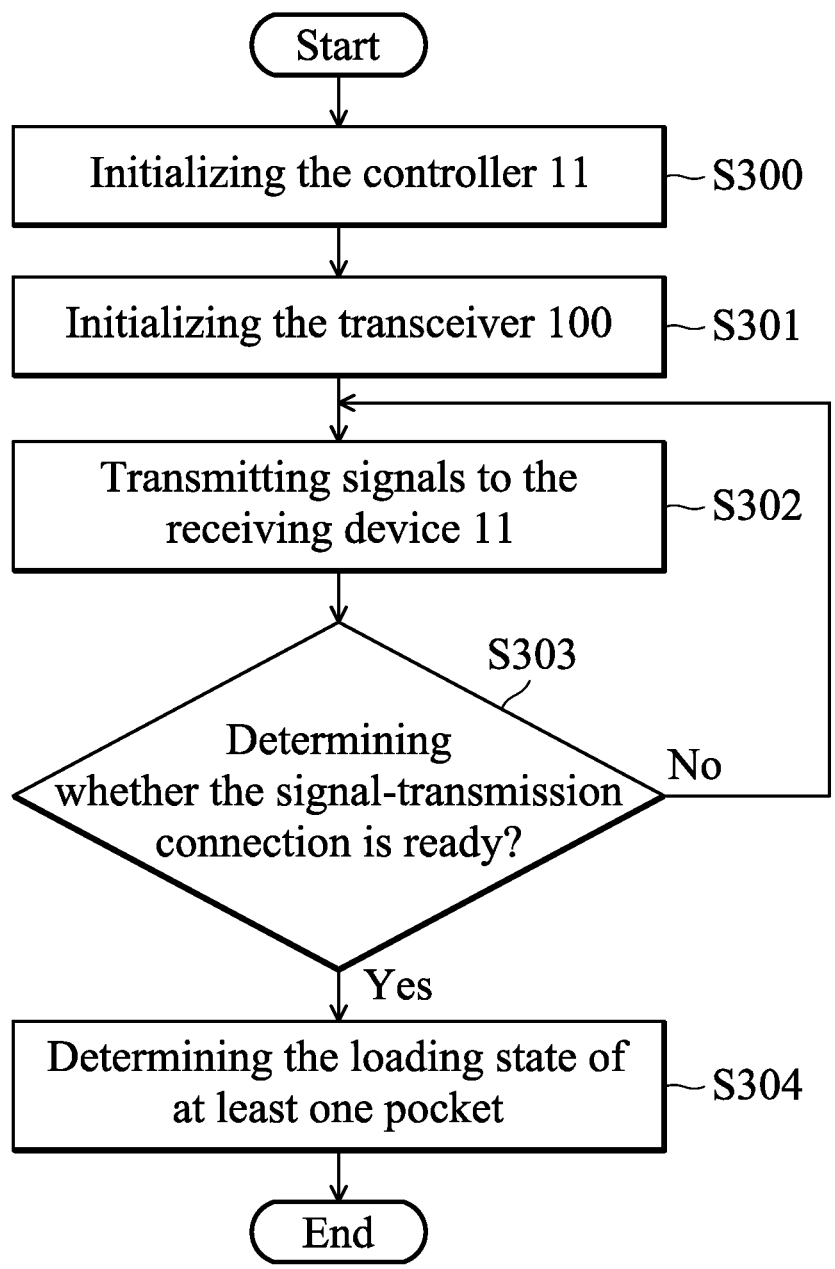
FIG. 3 shows a flow chart of a detection method performed by the content detection device in FIG. 1 when content detection is performed according to one exemplary embodiment.

In the following paragraphs, the procedure for the detection method which is performed by the content detection device 10 when the electronic system 1 performs the content detection will be described. Referring to FIGS. 1 and 3, first, the controller 101 is initialized (step S300). Then, the transceiver 100 is initialized (step S301). After the transceiver 100 is initialized, the controller 101 transmits signals (such as data packets) to the receiving device 11 through the transceiver 100 (step S302), thereby determining whether the signal-transmission connection from the transceiver 100 to the receiving device 11 is ready (step S303). In the embodiment, the transceiver 100 performs a signal transmission with the receiving device 11 through a wireless connection. When the signals are not transmitted successfully, it is determined that the wireless connection is not ready, and then the method reverts back to step S302. The controller 101 continuously transmits signals to the receiving device 11 until the signals are transmitted successfully. When the signals are transmitted successfully, the controller 101 detects the state of each sensor and performs a determination operation to determine whether an object is in an internal space of at least one pocket according to the detected states of the sensors (that is, to determine the loading state of at least one pocket) (step S304). The embodiment of FIG. 2B is given as an example to illustrate step S304. The controller 101 detects the state of each of the sensors 202_1~202_6 and performs a determination operation to determine whether an object is in the internal space of the pocket 20 according to the detected states of the sensors (that is, to determine the loading state of the pocket 20) and further determine whether an object is in the internal space of pocket 21 according to the detected states of the sensors (that is, to determine the loading state of pocket 21). Each time the controller 101 completes the determination operation for the loading state of one pocket, the controller 101 generates a corresponding notification signal indicating the determination result and transmits the notification signal to the receiving device 11, thereby notifying the processor core 110 of the loading state of the pocket. In the embodiment, the information represented by each notification signal includes the loading state of the corresponding pocket and the reference pocket number of the corresponding pocket.

Figure 4A:
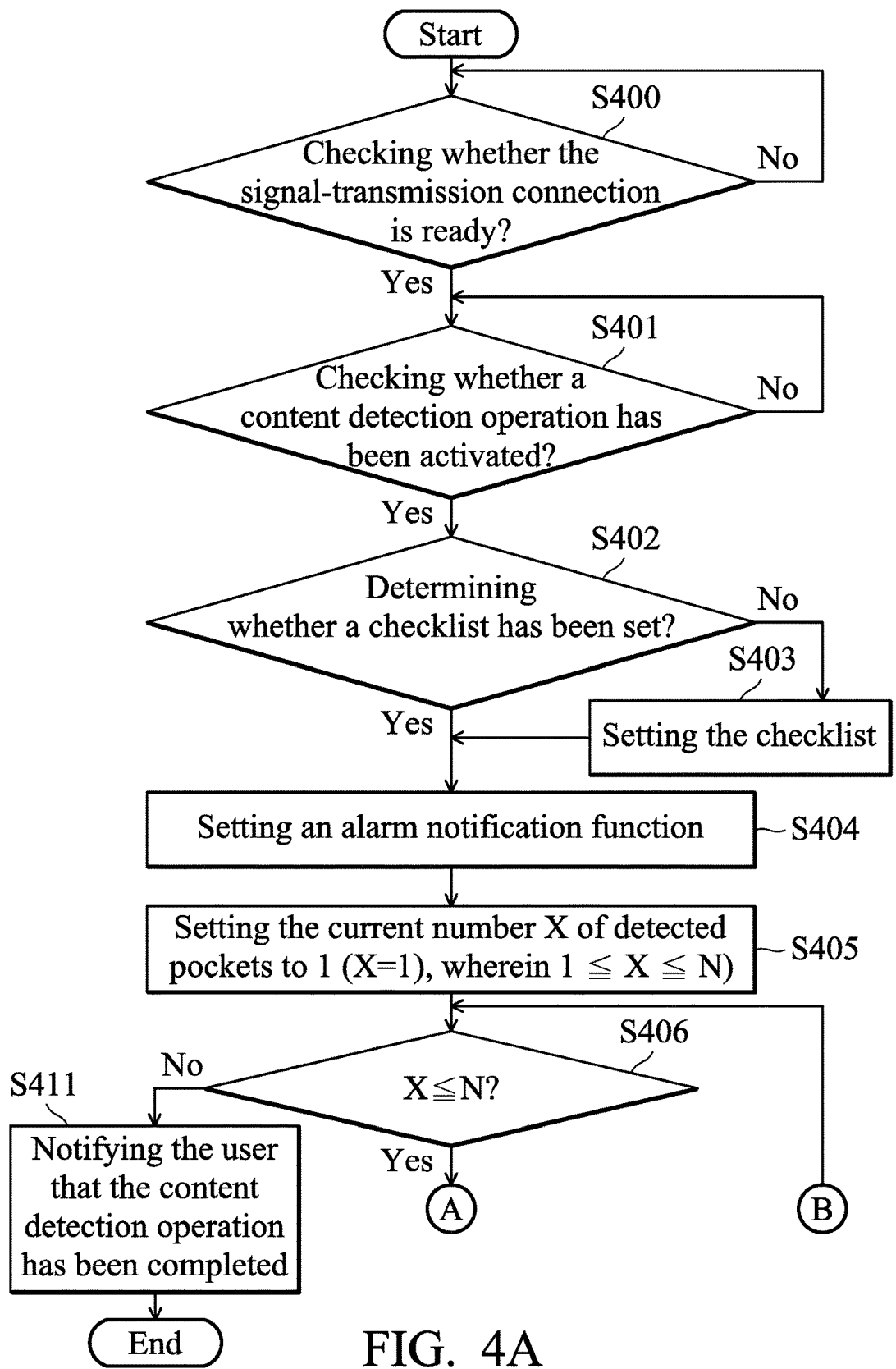
FIGS. 4A and 4B show a flow chart of an operation performed by the receiving device according to one exemplary embodiment.
Figure 4B:
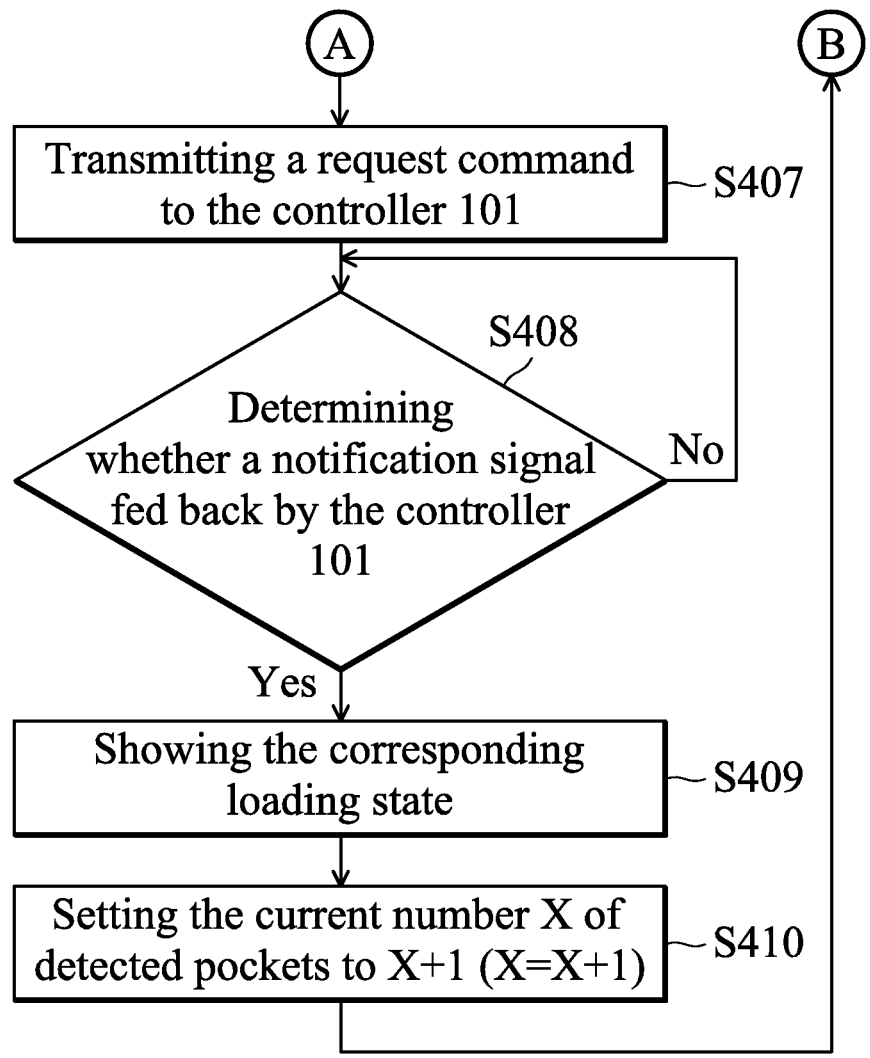

In the following paragraphs, the procedure for the operation of the processor core 110 of the receiving device 11 will be described. Referring to FIGS. 4A and 4B, first, the processor core 110 checks whether the signal-transmission connection of the transceiver 111 for an external device is ready (step S400). In the embodiment, the transceiver 111 performs a signal transmission with the content detection device 10 through a wireless connection. When the signal-transmission connection is not ready, the procedure reverts back to step S400, and the processor core 110 continuously checks whether the signal-transmission connection of the transceiver 111 is ready. When the signal-transmission connection is ready, the processor core 110 checks whether a content detection operation has been activated (step S401). In an embodiment, the processor core 110 checks whether the content detection operation has been activated by checking whether a corresponding content detection application program has been executed. When the processor core 110 performs the content detection application program, the signal transmission between the receiving device 11 and the content detection device 10 is performed, which will be described below. When the content detection operation has not been activated, the procedure returns to step S410, and the processor core 110 continuously checks whether the content detection operation has been activated. When the content detection operation has been activated, the processor core 110 determines whether a checklist has been set (step S402). In the embodiment, the checklist comprises the following information: the number N of pockets where at least one sensor is disposed (that is the number N of pockets to be detected, referred to as "the target number N of pockets"), the reference pocket numbers of the pockets, and, for each detected pocket, the name of the object which is expected to be disposed in the corresponding detected pocket. In an embodiment, a user can set the target number N of pockets and the reference pocket numbers of the pockets using an input module of the receiving device 11 (such as a substantial keyboard or a virtual keyboard shown on the display 112) through the content detection application program. In another embodiment, since the controller 101 of the content detection device 10 knows how many pockets have sensors disposed in them and what the reference pocket numbers of the pockets are, the processor core 110 can set the target number N of pockets and the reference pocket numbers of the pockets according to bag information which is transmitted from the controller 101. For example, in the embodiment of FIG. 2B, the sensors 201_1~201_6 are disposed in the two pockets 20 and 21, and, thus, N=2. When the checklist has not been set, the processor core 110 then sets the checklist (step S403). When the checklist has been set, the processor core 110 sets an alarm notification function (step S404). In the embodiment, the alarm notification function can be implemented by displaying images or messages on the display 112 or playing an audio alarm through the speaker 113. After the above basic setting is completed, the processor core 110 will obtain a notification signal related to each pocket from the content detection device 10, thereby making itself aware of the loading states of each pocket.

Still referring to FIGS. 4A and 4B, when the processor core 110 executes the content detection application program, the processor core 110 sets the current number X of pockets which have been detected (referred to as "the current number X of detected pockets") to an initial value (that is, X is set to 1 (X=1), wherein 1≤X≤N) (step S405). Then, in step S406, the processor core 110 determines whether the current number X of detected pockets is less than or equal to N (X≤N?). The condition whereby the current number X of detected pockets is less than or equal to N indicates that there is at least one pocket whose loading state (the loading state indicates whether there is an object in the internal space of the pocket or not) has not been detected yet. In such cases, the procedure returns to step S407. In step S407, the processor core 110 transmits a request command to the controller 101 of the content detection device 10 through the transceiver 111. The request command is applied to request the content detection device 10 to detect the loading state of a pocket. Then, in step S408, the processor core 110 determines whether a notification signal fed back by the controller 101 in response to the request command is received. When the processor core 110 has not received any notification signal yet, the processor core 110 continuously waits for a notification signal. When the processor core 110 receives a notification signal from the controller 101, the processor core 110 shows the corresponding loading state on the display 112 according to the received notification signal (step S409). For example, when the processor core 110 receives the notification signal related to the pocket 20, the processor core 110 controls the display 112 to show the loading state of the pocket 20 indicated by the received notification signal. Moreover, the processor core 110 can also show the corresponding reference pocket number according to the received notification signal, for example, the reference pocket number "#1" of the pocket 20. In an embodiment, when the received notification signal indicates that the loading state indicates that there is no object in the internal space, the processor core 110 can control the speaker 113 to play a specific audio alarm to alert the user of this situation. Then, the processor core 110 sets the current number X of detected pockets to X+1 (X=X+1) (step S410). After step S410, the procedure returns to step S406, and steps S406~S410 are performed repeatedly to obtain another notification signal indicating the loading state of the next pocket until the notification signals related to all the pockets have been received by the processor core 110 (that is, X>N, step S406—No). At this time, the processor core 110 can notify the user that the content detection operation has been completed through the display 112 or the speaker 113 (step S411).

Figure 5A:
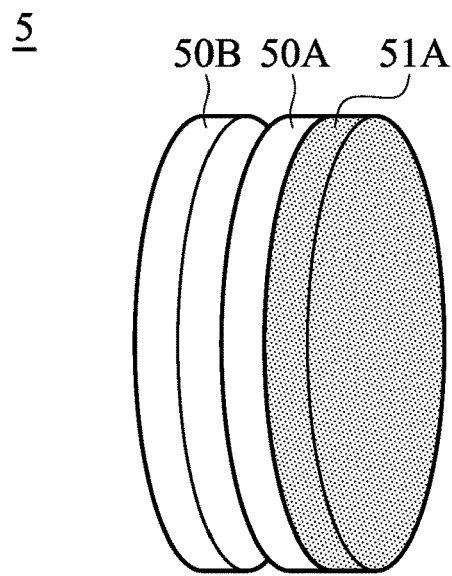
FIG. 5A shows one exemplary embodiment of a sensor.
Figure 5B:
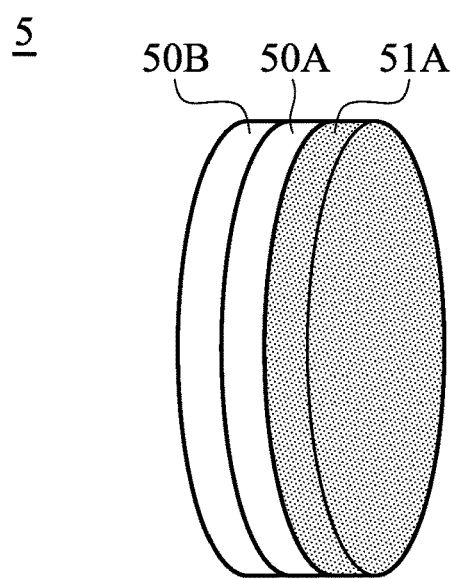
FIGS. 5B and 5C are schematic views showing the different states of the sensor of FIG. 5A in different conditions.
Figure 5C:
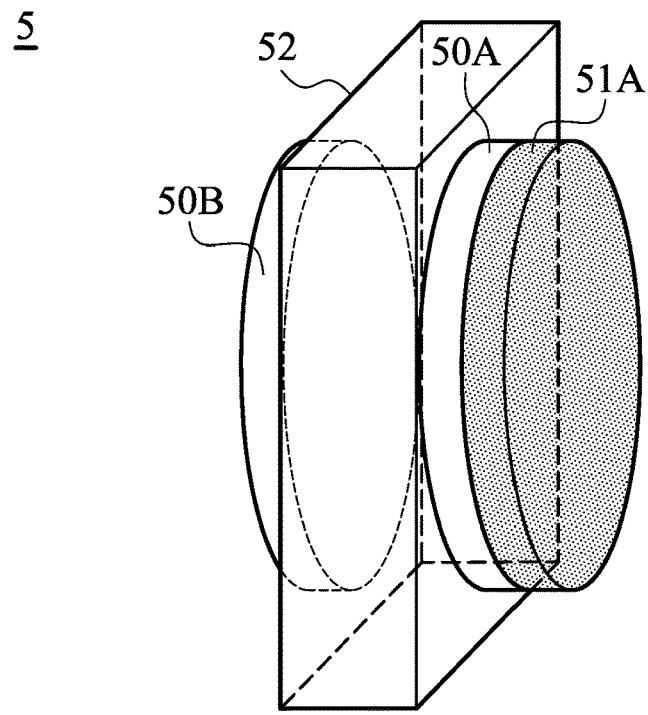

FIG. 5A shows one exemplary embodiment of the sensors. The sensor 5 shown in FIG. 5A is implemented for each sensor in FIG. 2A or each sensor in FIG. 2B. Referring FIG. 5A, the sensor 5 comprises two conductive elements 50A and 50B and a magnetic element 51A. The conductive element 50A is disposed on one wall of the corresponding pocket, while the conductive element 50B is disposed on the other wall of the corresponding pocket. The magnetic element 51A connects with or contacts one of the conductive elements 50A and 50B. In the embodiment of FIG. 5A, the magnetic element 51A contacting or connecting with the conductive element 50A is given as an example for illustration. The magnetic element 51A and the conductive element 50A are disposed on the same wall. For example, referring to FIGS. 2A and 2B, when the sensor 5 serves as the sensor 202_1, the conductive element 50A and the magnetic element 51A are disposed on the wall W22 of the pocket 20, while the conductive element 50B is disposed on the wall W21 of the pocket 10. Referring to FIG. 5B, when there is no object between the conductive elements 50A and 50B, the conductive element 50A contacts the conductive element 50B through the magnetic force provided by the magnetic element 51A, that is, the voltage of the conductive element 50A is the same as the voltage of the conductive element 50B. Referring to FIG. 5C, when there is an object 52 between the conductive elements 50A and 50B, the conductive element 50A does not contact the conductive element 50B. Thus, the conductive elements 50A and 50B have respective voltages. In other words, the voltage of the conductive element 50A is different from the voltage of conductive element 50B. For example, the conductive element 50A is coupled to the ground of the content detection device 10, and the conductive element 50B is coupled to a voltage source, such as 5V. The voltage source is provided by a power supplier. The power supplier can be an independent power source (such as a battery) or one portion of the content detection device 10. When the conductive element 50A contacts the conductive element 50B, the voltages of the conductive elements 50A and 50B are equal to the voltage of the ground. When the conductive element 50A does not contact the conductive element 50B, the voltage of the conductive element 50A is equal to 5V, and the voltage of the conductive element 50B is equal to the voltage of the ground.

Figure 5D:
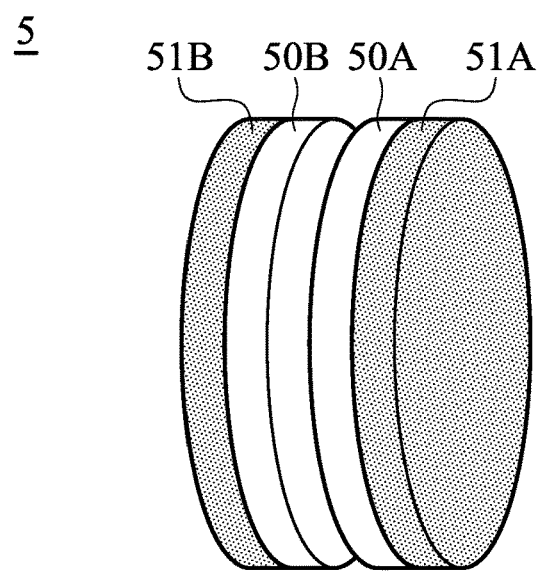
FIG. 5D shows another exemplary embodiment of a sensor.

In an exemplary embodiment, referring to FIG. 5D, the sensor 5 further comprises a magnetic element 51B which connects with or contacts the conductive element 50B. The magnetic element 51B and the conductive element 50B are disposed on the same wall of the corresponding pocket. Through the arrangement of the two magnetic elements 51A and 51B, the magnetic force between the conductive elements 50A and 50B is increased, thereby decreasing the erroneous detection of the content detection device 10 and enhancing its accuracy.

Figure 6A:
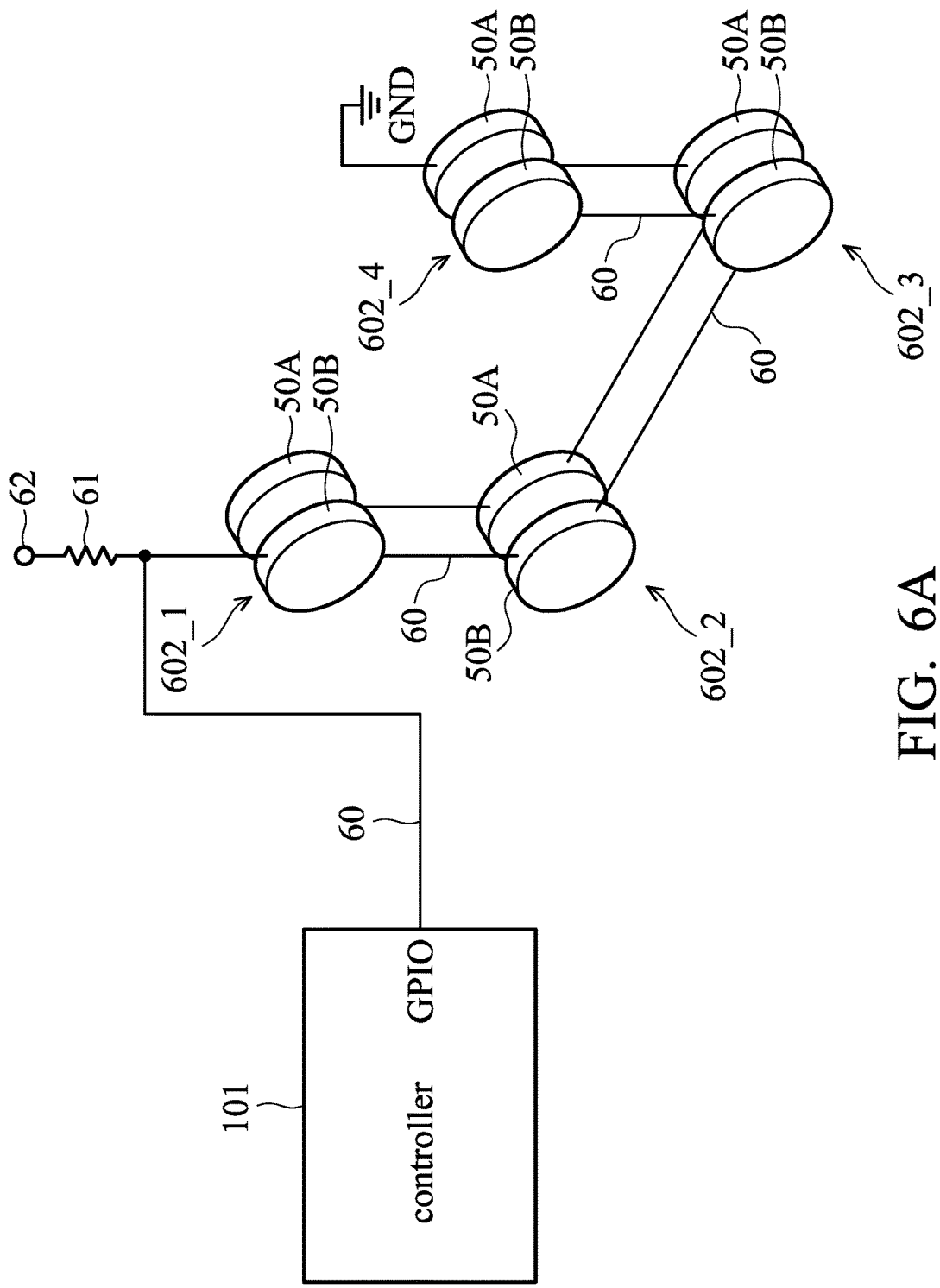
FIG. 6A is a schematic view showing the connection relationship between sensors and the connection relationship between the sensors and a controller according to one exemplary embodiment.

In the following paragraphs, in cases where there are a plurality of sensors in a pocket, the connection relationship between the sensors and the connection relationship between the sensors and the controller 101 will be described. A pocket with four sensors is given as an example for illustration. Referring to FIG. 6A, an in exemplary embodiment, there are four sensors 602_1~602_4 disposed in the same pocket, such as the pocket 21 shown in FIG. 2A. Each of the sensors 602_1~602_4 has the same structure as sensor 5 shown in FIG. 5A. In FIG. 6A, in order to clearly illustrate the connection relationship between the sensors, the magnetic elements 51A are not shown. The conductive elements 50A of the sensors 602_1~602_4 are coupled in series and coupled to the ground terminal GND of the content detection device 10. The conductive elements 50B of the sensors 602_1~602_4 are coupled in series through a conductive line 60 and coupled to the input/output terminal GPIO of the controller 101 through the conductive line 60. In other words, through the conductive line 60, the conductive elements 50B of the sensors 602_1~602_4 have the same voltage. Moreover, the conductive elements 50B of the sensors 602_1~602_4 which are coupled in series are coupled to a voltage source 62 (such as 5V) through a resistor 61. The voltage source 62 is provided by a power supply. The power supply can be an independent power source (such as a battery) or one portion of the content detection device 10. It is assumed that there are several pockets and there are several sensors disposed on each pocket, and the connection relationship between the sensors of each pocket and the connection relationship between the sensors of each pocket and the controller 101 are the same as those shown in FIG. 6A.

Figure 6B:
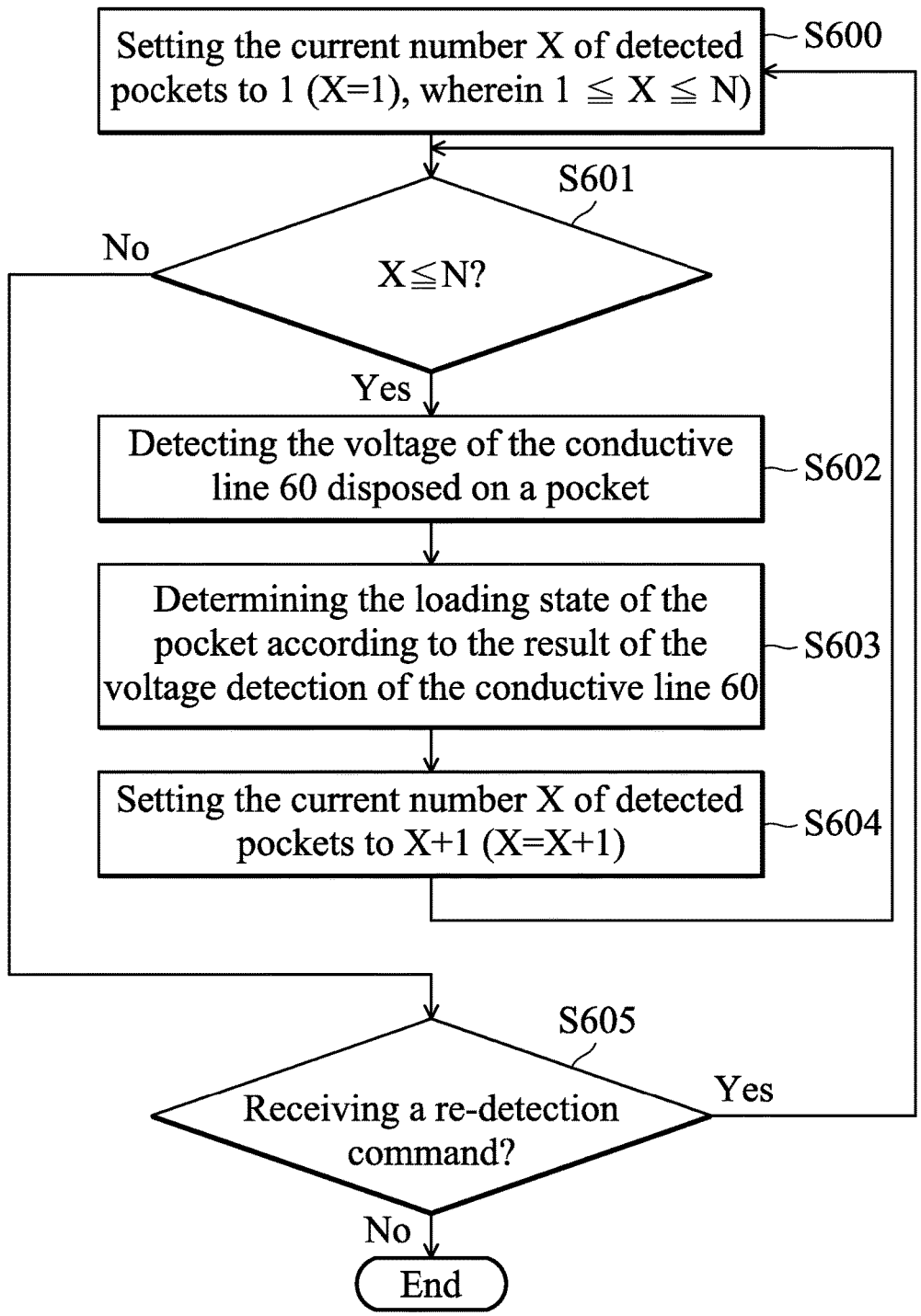
FIG. 6B shows a flow chart of a detection method performed by the content detection device in response to the connection relationship between the sensors shown in FIG. 6A.

When there are the sensors 602_1~602_4 shown in FIG. 6A in each pocket to be detected, step S304 in FIG. 3 further comprises the steps in FIG. 6B. Referring to FIG. 6B, when the controller 101 performs step S304 in FIG. 3, the controller 101 sets the current number X of pockets which have been detected (that is, the current number X of detected pockets) to an initial value (that is, X is set to 1 (X=1), wherein 1≤X≤N) (step S600). As described above, N is the target number of pockets. Then, in step S601, the controller 101 determines whether the current number X of detected pockets is less than or equal to N (X≤N?). The condition whereby the current number X of detected pockets is less than or equal to N indicates that there is at least one pocket whose loading state has not been detected yet. In such cases, the procedure proceeds to step S602. When the controller 101 receives the request command transmitted by the processor core 110 in step S407 in FIG. 4B, the controller 101 detects the voltage of the conductive line 60 disposed on a pocket (step S602). Referring to FIG. 6A, when there is no object in the internal space of the pocket, the conductive elements 50A of the sensors 602_1~602_4 contact the conductive elements 50B of the sensors 602_1~602_4 respectively. At this time, the controller 101 detects that the voltage of the line 60 is the voltage of the ground terminal. When there is an object in the internal space of the pocket, the object separates the conductive elements 50A of the sensors 602_1~602_4 from the conductive elements 50B of the sensors 602_1~602_4. At this time, the controller 101 detects that the voltage of the line 60 is a predetermined voltage, wherein the predetermined voltage is equal to or slightly lower than the voltage of the voltage source 62 (that is, the predetermined voltage is equal to or slightly lower than 5V). Thus, the controller 101 can detect the contact state between the conductive elements 50A and 50B of the sensors 602_1~602_4 according to the voltage of the conductive line 60. Accordingly, the controller 101 determines whether an object is in the internal space of the pocket according to the result of the voltage detection of the conductive line 60, that is, the controller 101 determines the loading state of the pocket according to the result of the voltage detection of the conductive line 60 (step S603). After the loading state of the pocket is determined, the controller 101 generates a corresponding notification signal according to the determined loading state and transmits the notification signal to the processor core 110. Then, the controller 101 sets the current number X of detected pockets to be X+1 (X=X+1) (step S604). After step S604, the procedure returns to step S601, and steps S601~S604 are performed repeatedly to determine the loading state of the next pocket until the loading states of all of the pockets are determined (that is, X>N, step S601-No). When the controller 101 receives a re-detection command transmitted by the processor core 110 (step S605), the controller 101 re-performs steps S600~S604. When the controller 101 does not receive any re-detection command, the content detection operation ends.

Figure 7A:
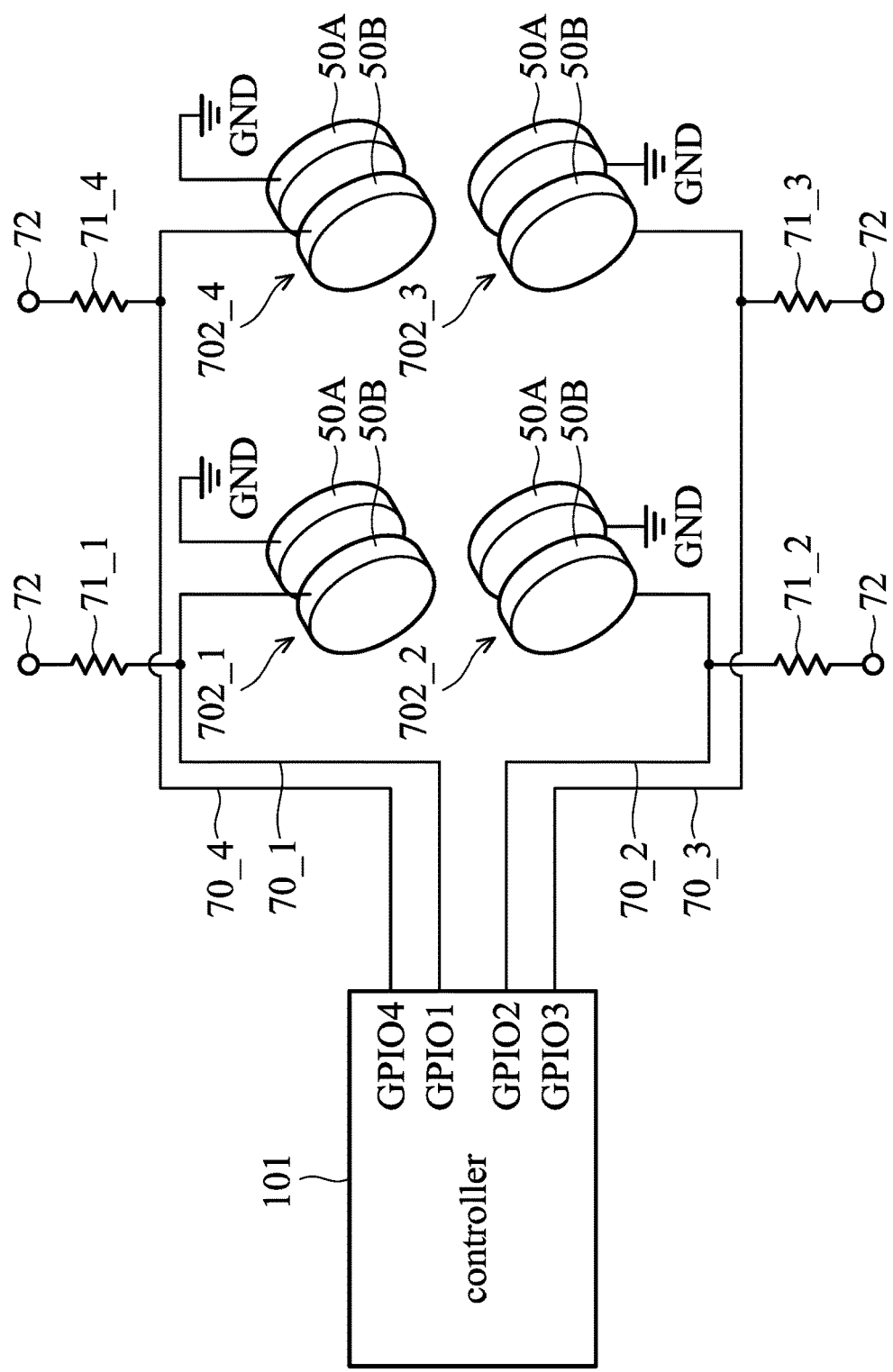
FIG. 7A is a schematic view showing the connection relationship between sensors and the connection relationship between the sensors and a controller according to another exemplary embodiment.

In another embodiment, referring to FIG. 7A, sensors 702_1~702_4 are disposed in the same pocket, such as the pocket 21 of FIG. 2A. Each of the sensors 702_1~702_4 has the same structure as sensor 5 shown in FIG. 5A. In FIG. 7A, in order to clearly illustrate the connection relationship between the sensors, the magnetic elements 51A are not shown. The conductive elements 50A of the sensors 702_1~702_4 are coupled to the ground terminal GND of the content detection device 10. The conductive elements 50B of the sensors 702_1~702_4 are coupled to the input/output terminals GPIO1~GPIO4 of the controller 101 through the conductive line 70_1~70_4, respectively. In other words, each conductive line and the corresponding conductive element coupled to the conductive line have the same voltage. Moreover, the conductive elements 50B of the sensors 702_1~702_4 are coupled to a voltage source 72 (such as 5V) through resistors 71_1~71_4, respectively. The voltage source 72 is provided by a power supply. The power supply can be an independent power source (such as a battery) or one portion of the content detection device 10.

Figure 7B:
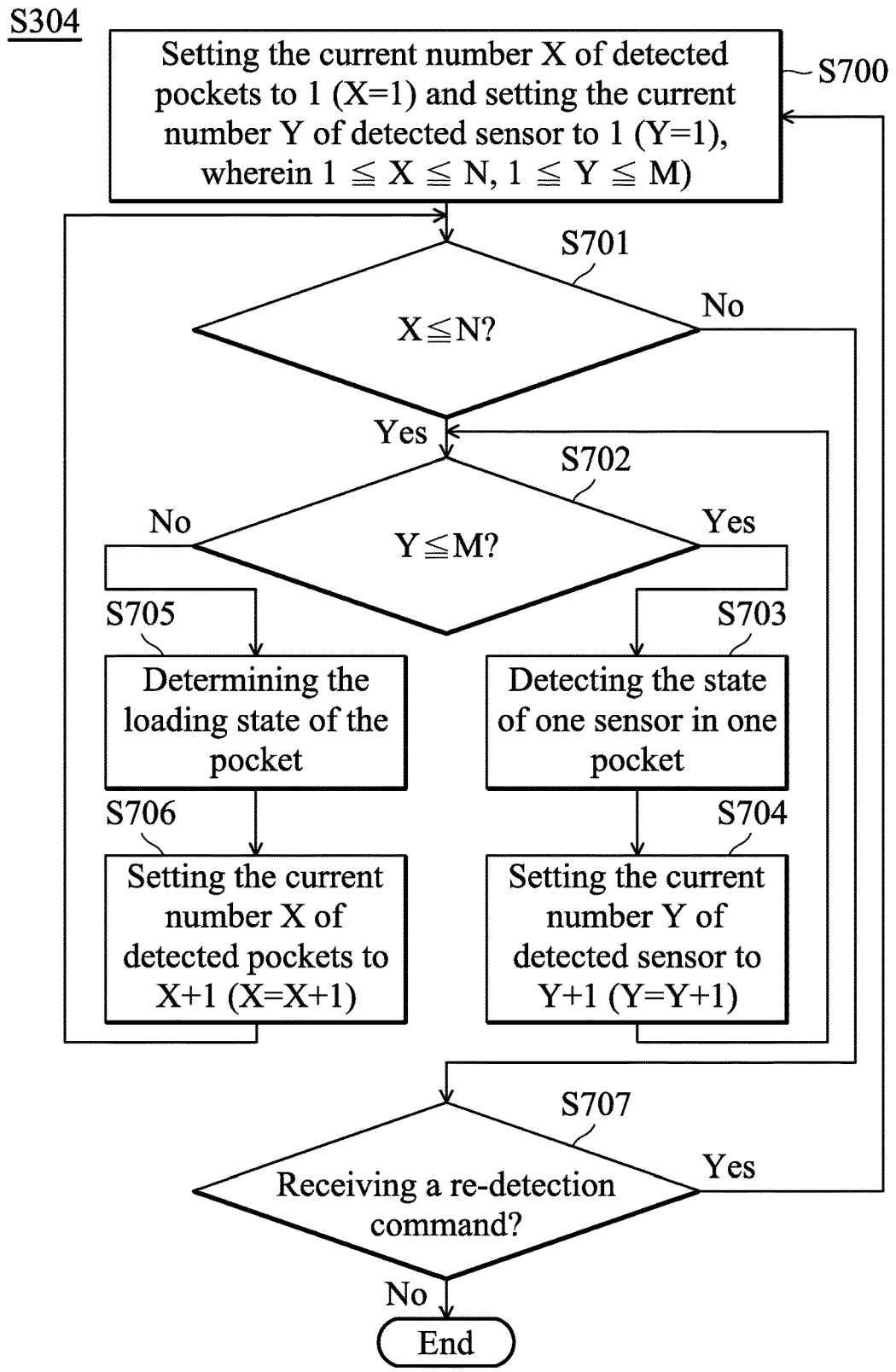
FIG. 7B shows a flow chart of a detection method performed by the content detection device in response to the connection relationship between the sensors shown in FIG. 7A.

When there are the sensors 702_1~702_4 shown in FIG. 7A in each pocket to be detected (that is, the target number M of sensors is 4 (M=4)), step S304 in FIG. 3 further comprises the steps in FIG. 7B. Referring to FIG. 7B, when the controller 101 performs step S304 in FIG. 3, the controller 101 sets the current number X of pockets which have been detected (that is, the current number X of detected pockets) to an initial value (that is, X is set to 1 (X=1), wherein 1≤X≤N) and also sets the current number Y of sensors which have been detected (referred to as "the current number Y of detected sensor") to an initial value (that is, Y is set to 1 (Y=1), wherein 1≤Y≤M) (step S700). Then, in step S701, the controller 101 determines whether the current number X of detected pockets is less than or equal to N (X≤N?). The condition whereby the current number X of detected pockets is less than or equal to N indicates that there is at least one pocket whose loading state has not been detected yet. In such cases, the procedure proceeds to step S702 to perform the steps for determining the loading state of one pocket. First, when the controller 101 receives the request command transmitted by the processor core 110 in step S407 in FIG. 4B, the controller 101 determines whether the current number Y of detected sensors is less than or equal to M (Y≤M?) (step S702). The condition whereby the current number Y of detected sensors is less than or equal to M indicates that there is at least one sensor in the pocket whose state has not been detected yet. At this time, the controller 101 detects the state of one sensor in the pocket (step S703). In step S703, the controller 101 can detect the voltage of the conductive line of the sensor to detect the state of the sensor. Referring to FIG. 7A, the sensor 702_1 is given as an example for illustration. When there is no object between the conductive elements 50A and 50B of the sensor 702_1, the conductive element 50A contacts the conductive element 50B. At this time, the controller 101 detects that the voltage of the line 70_1 is the voltage of the ground terminal. When there is an object between the conductive elements 50A and 50B of the sensor 702_1, the object separates the conductive element 50A from the conductive element 50B. At this time, the controller 101 detects that the voltage of the line 70_1 is a predetermined voltage, wherein the predetermined voltage is equal to or slightly lower than the voltage of the voltage source 72 (that is, the predetermined voltage is equal to or slightly lower than 5V). Thus, the controller 101 detects the state of the sensor 702_1 (that is, the contact state between the conductive elements 50A and 50B of the sensor 702_1) according to the voltage of the conductive line 70_1. Then, the controller 101 sets the current number Y of sensors to be Y+1 (Y=Y+1) (step S704). After step S704, the procedure returns to step S702, and steps S702~S704 are performed repeatedly to detect the state of the next sensor in the same pocket until the states of all of the sensors in the same pocket are detected (that is, Y>M, step S702—No). When the states of all of the sensors in the same pocket have been detected, the controller 101 determines whether at least one object is in the internal space of the pocket according to the detected states of all of the sensors, that is, the controller 101 determines the loading state of the pocket according to the detected states of all of the sensors (step S705). For one pocket, once the controller 101 detects that the voltage of the conductive line 70 of one sensor is equal to the predetermined voltage, the controller 101 determines that at least one object is in the internal space of the pocket. After the loading state of the pocket is determined, the controller 101 generates a corresponding notification signal according to the determined loading state and transmits the notification signal to the processor core 110. Then, the controller 101 sets the current number X of detected pockets to be X+1 (X=X+1) (step S706). After step S706, the procedure returns to step S701, and steps S701~S706 are performed repeatedly to determine the loading state of the next pocket until the loading states of all of the pockets are determined (that is, X>N, step S701—No). When the controller 101 receives a re-detection command transmitted by the processor core 110 (step S707), the controller 101 re-performs steps S700~S707. When the controller 101 does not receive any re-detection command, the content detection operation ends.

In the above embodiment, when a plurality of sensors are disposed in a plurality of pockets, the number of sensors in one pocket is equal to the number of sensors in each of the other pockets. As shown in FIG. 2B, the number (M) of sensors in each pocket is equal to 3. In another embodiment, the number of sensors in at least one pocket is different from the number of sensor in one of the other pockets. In such cases, in the embodiment of FIG. 7B, when the determination for the loading state of the next pocket (steps S702~S706), the value of the number M may be changed and be different from the value of the number M for the previous loading-state determination.

Figure 8A:
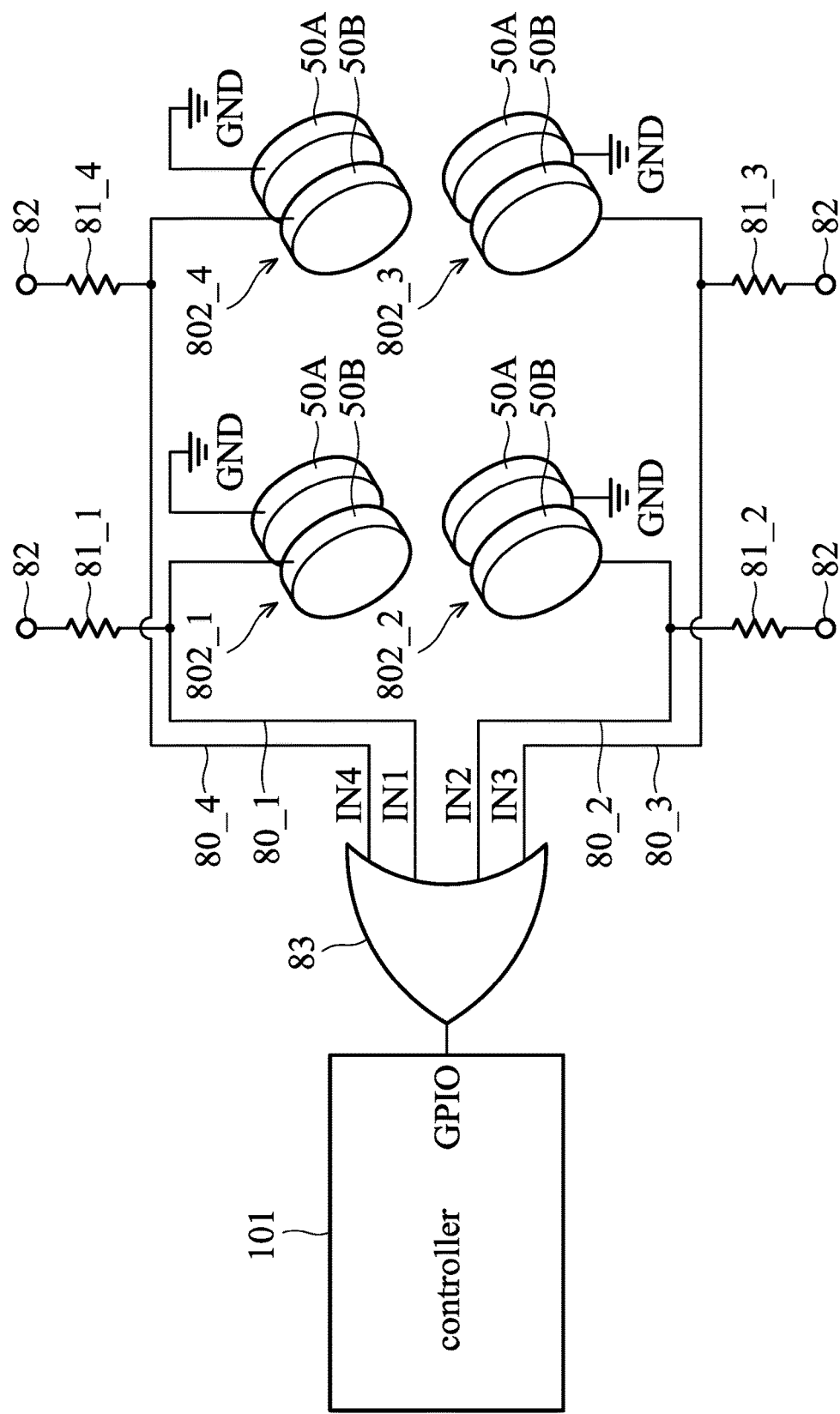
FIG. 8A is a schematic view showing the connection relationship between sensors and the connection relationship between the sensors and a controller according to another exemplary embodiment.

In another embodiment, referring to FIG. 8A, sensors 802_1~802_4 are disposed in the same pocket, such as the pocket 21 of FIG. 2A. Each of the sensors 802_1~802_4 has the same structure as sensor 5 which is shown in FIG. 5A. In FIG. 8A, in order to clearly illustrate the connection relationship between the sensors, the magnetic elements 51A are not shown. The conductive elements 50A of the sensors 802_1~802_4 are coupled to the ground terminal GND of the content detection device 10. The conductive elements 50B of the sensors 802_1~802_4 are coupled to the input terminals IN1~IN4 of the OR gate 83 through the conductive line 80_1~80_4, respectively. In other words, each conductive line and the corresponding conductive element coupled to the conductive line have the same voltage. Moreover, the conductive elements 50B of the sensors 802_1~802_4 are coupled to a voltage source 82 (such as 5V) through resistors 81_1~81_4, respectively. The voltage source 82 is provided by a power supply. The power supply can be an independent power source (such as a battery) or one portion of the content detection device 10. The output terminal of the OR gate 83 is coupled to the input/output terminal GPIO of the controller 101. In the embodiment, the OR gate is one element included in the content detection device 10.

Figure 8B:
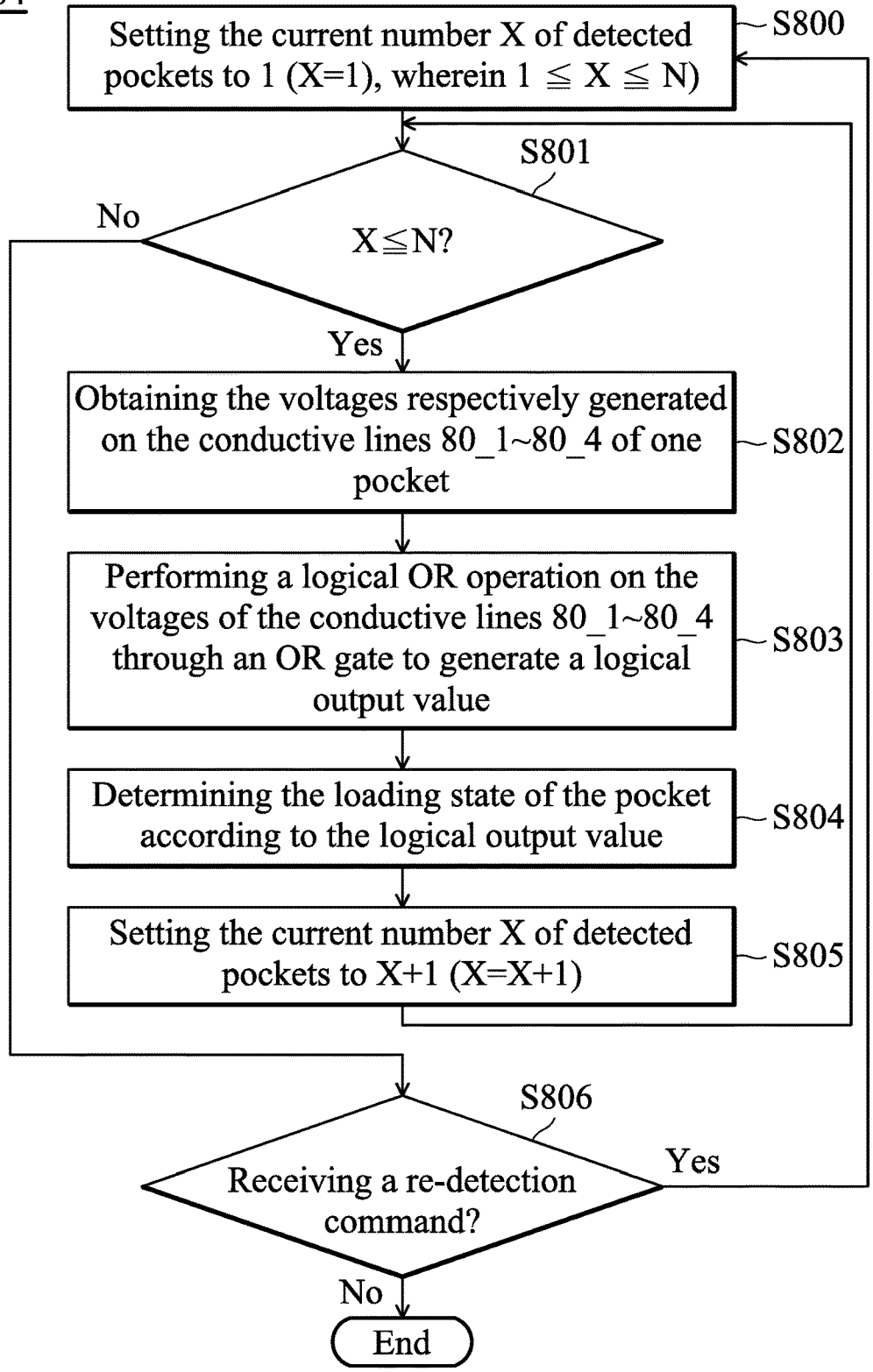
FIG. 8B shows a flow chart of a detection method performed by the content detection device in response to the connection relationship between the sensors shown in FIG. 8A.

When there are the sensors 802_1~802_4 shown in FIG. 8A in each pocket to be detected, step S304 in FIG. 3 further comprises the steps in FIG. 8B. Referring to FIG. 8B, when the controller 101 performs step S304 in FIG. 3, the controller 101 sets the current number X of pockets which have been detected (that is, the current number X of detected pockets) to an initial value (that is, X is set to 1 (X=1), wherein 1≤X≤N) (step S800). As described above, N is the target number of pockets. Then, in step S801, the controller 101 determines whether the current number X of detected pockets is less than or equal to N (X≤N?). The condition whereby the current number X of detected pockets is less than or equal to N indicates that there is at least one pocket whose loading state has not been detected yet. In such cases, the procedure proceeds to step S802. When the controller 101 receives the request command transmitted by the processor core 110 in step S407 in FIG. 4B, the voltages generated on the conductive lines 80_1~80_4 respectively coupled to the sensors 802_1~802_4 on one pocket are obtained (step S802). Referring to FIG. 8A, the sensor 802_1 is given as an example for illustration. When there is no object between the conductive elements 50A and 50B of the sensor 802_1, the conductive element 50A contacts the conductive element 50B. At this time, the voltage generated on the line 80_1 is the voltage of the ground terminal which serves as the logical value "0". When there is an object between the conductive elements 50A and 50B of the sensor 802_1, the object separates the conductive element 50A from the conductive element 50B. At this time, the voltage generated on the line 80_1 is a predetermined voltage which serves as the logical value "1", wherein the predetermined voltage is equal to or slightly lower than the voltage of the voltage source 82 (that is, the predetermined voltage is equal to or slightly lower than 5V). Thus, the controller 101 detects the state of the sensor 802_1 (that is, the contact state between the conductive elements 50A and 50B of the sensor 802_1) according to the voltage of the conductive line 80_1. After the voltages of the conductive lines 80_1~80_4 are generated, the OR gate performs a logical OR operation on the voltages of the conductive lines 80_1~80_4 to generate a logical output value (step S803). The controller 101 determines whether an object is in the internal space of the pocket according to the logical output value, that is, the controller 101 determines the loading state of the pocket according to the logical output value (step S804). Based on the logic operation of the OR gate 83, for one pocket, once the voltage of one conductive line is equal to the predetermined voltage, the controller 101 determines that at least one object is in the internal space of the pocket. Accordingly, the controller 101 determines the loading state of the pocket according to the voltages of the conductive lines 80_1~80_4. At this time, the controller 101 generates a corresponding notification signal according to the determined loading state and transmits the notification signal to the processor core 110. Then, the controller 101 sets the current number X of detected pockets to be X+1 (X=X+1) (step S805). After step S805, the procedure returns to step S801, and steps S801~S805 are performed repeatedly to determine the loading state of the next pocket until the loading states of all of the pockets are determined (that is, X>N, step S801—No). When the controller 101 receives a re-detection command transmitted by the processor core 110 (step S806), the controller 101 re-performs steps S800~S805. When the controller 101 does not receive any re-detection command, the content detection operation ends.

According to the above embodiments, the content detection device can detect whether there is an object in each pocket of the user's carry bag (or clothing). The detection result can be transmitted to the user's portable device, thereby reminding the user about whether the user forgot to take certain objects along. The user can identify which object the user has taken along or which object the user forgot to take along by setting a checklist on the portable device. The content detection device of the embodiments can communicate with the portable device, thereby enhancing the performance of the portable device and providing convenience for the user.

In the above embodiments, each sensor of the content detection device is implemented by two conductive elements and at least one magnetic element. Referring to FIGS. 5A-5C, each sensor has two different states: the conductive element 50A is in contact with the conductive element 50B; the conductive element 50A is separated from the conductive element 50B. The two states induce that there are two different voltages for the conductive element 50. Thus, the sensor with the above structure operates at a switch. In other embodiments, each sensor of the content detection device can be implemented by an element operating as a switch.

According to the above embodiments, the processor core 101 transmits a request command in step S407 of FIG. 4B, and the controller 101 performs the determination of the loading states of the pockets after receiving the request command. In another embodiment, when the initialization of the content detection device 10 and the initialization of the transceiver 100 (at steps S300 and S301) have been completed and the transmission connection between the transceiver 100 and the receiving device 11 is ready, the content detection device 10 can determine the loading state of each pocket in real time. Each time that the loading state of one pocket is determined, the controller 101 compares the current determination result with the previous determination result for the same pocket, that is, the controller 101 compares the current loading state with the previous loading state. When the controller 101 determines that the current determination result is different from the previous determination result, the controller 101 automatically generates a notification signal to the receiving device 11, thereby notifying the user that the loading state of the pocket has changed. The change in loading state may indicate that the object which was in the pocket originally is out of the pocket now or that there is an object in the pocket where there was no object there previously. Through real-time content detection, the user's objects in the pockets can be protected from being stolen, and the user can be notified if any object which does not belong to the user is put in the user's carry bag.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A content detection device comprising:
a first sensor disposed near a space; and
a controller coupled to the first sensor and detecting a state of the first sensor,
wherein the controller performs a determination operation to determine whether an object is disposed in the space according to the detected state of the first sensor,
wherein the space is an internal space of a pocket, and the first sensor comprises:
a first conductive element disposed on a first wall of the pocket;
a second conductive element disposed on a second wall of the pocket which is opposite to the first wall of the pocket; and
a first magnetic element connecting with the first conductive element or the second conductive element,
wherein the first conductive element is coupled to a ground terminal, and the controller is coupled to the second conductive element to detect a contact state between the first conductive element and the second conductive element.

2. The content detection device as claimed in claim 1, wherein when the controller detects that the contact state indicates that the first conductive element and the second conductive element of the first sensor are in contact with each other, the controller determines that the object is in the space.

3. The content detection device as claimed in claim 1 further comprising:
a second sensor disposed near the space,
wherein the controller detects a state of the second sensor and performs the determination operation to determine whether the object is disposed in the space according to the detected state of the first sensor and the detected state of the second sensor.

4. The content detection device as claimed in claim 3, wherein the second sensor comprises:
a third conductive element disposed on the first wall of the pocket;
a fourth conductive element disposed on the second wall of the pocket; and
a second magnetic element connecting with the third conductive element or the third conductive element,
wherein the third conductive element of the second sensor is coupled to the ground terminal, and
wherein the second conductive element of the first sensor and the fourth conductive element of the second sensor are coupled to a voltage source.

5. The content detection device as claimed in claim 4, wherein the second conductive element of the first sensor and the fourth conductive element of the second sensor are coupled together through a conductive line and coupled to the controller through the conductive line; and
wherein the controller detects a voltage of the conductive line to represent the state of the first sensor and the state of the second sensor.

6. The content detection device as claimed in claim 5, wherein when the voltage of the conductive line is equal to a predetermined voltage, the controller determines that the object is in the space, and
wherein the predetermined voltage is different from a voltage of the ground terminal.

7. The content detection device as claimed in claim 4 further comprising:
a resistor having a first terminal coupled to the voltage source and a second terminal coupled to the second conductive element of the first sensor and the fourth conductive element of the second sensor.

8. The content detection device as claimed in claim 4, wherein the second conductive element of the first sensor is coupled the controller through a first conductive line, and the fourth conductive element of the second sensor is coupled the controller through a second conductive line,
wherein the controller detects a voltage of the first conductive line to indicate the state of the first sensor and detects a voltage of the second conductive line to indicate the state of the second sensor,
wherein when at least one of the voltage of the first conductive line and the voltage of the second conductive line is equal to a predetermined voltage, the controller determines that the object is in the space, and
wherein the predetermined voltage is different from a voltage of the ground terminal.

9. The content detection device as claimed in claim 1,
wherein the controller generates a determination result according to a result of the determination operation, and
wherein when the determination result which is generated when the controller currently performs the determination operation is different from the determination result which was generated when the controller previously performed the determination operation, the controller generates a notification signal to an external electronic device.

* * * * *